Figure 4:
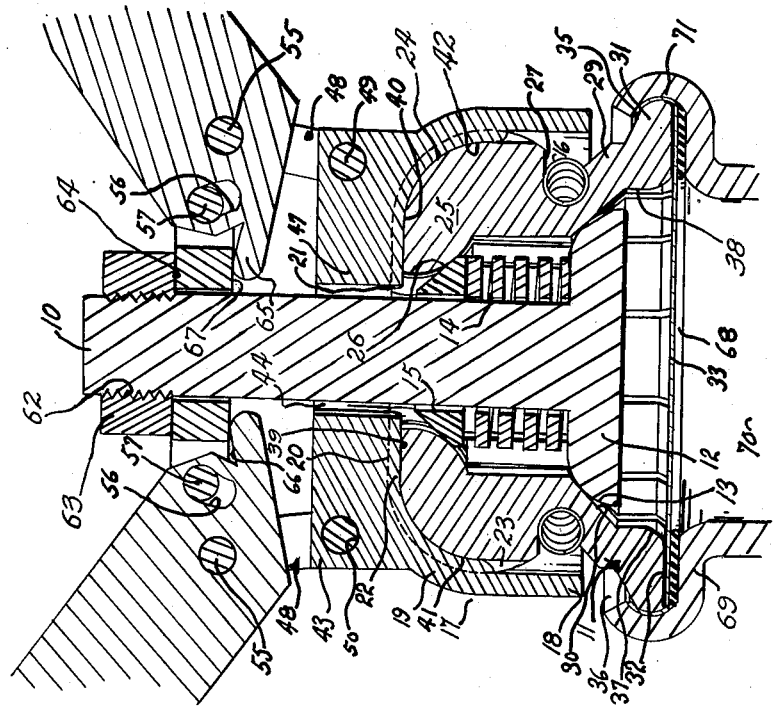

Aug. 10, 1954     M. J. QUILLINAN     2,685,997
SEALING TOOL
Filed Oct. 23, 1950     2 Sheets-Sheet 1
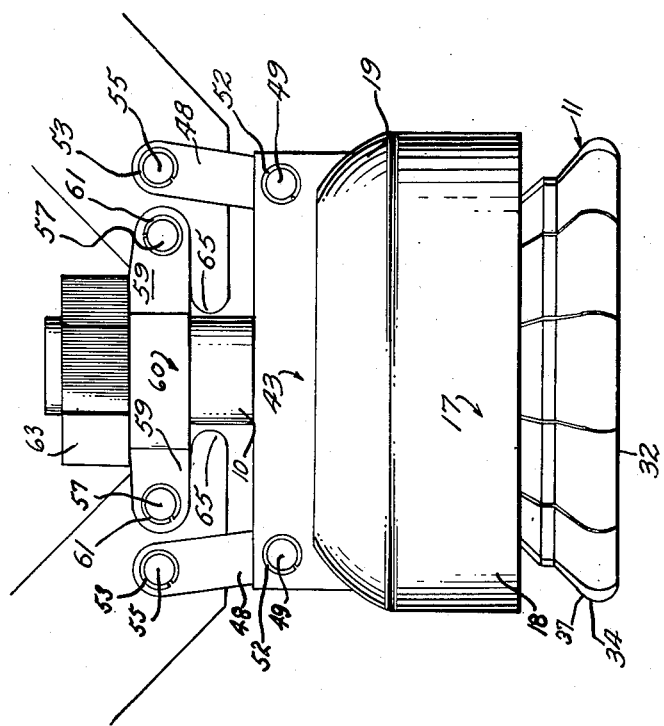
Inventor:
Michael J. Quillinan Aug. 10, 1954

M. J. QUILLINAN 2,685,997

SEALING TOOL

Filed Oct. 23, 1950

2 Sheets-Sheet 2

Inventor:
Michael J. Quillinan

Patented Aug. 10, 1954

2,685,997

UNITED STATES PATENT OFFICE 2,685,997

SEALING TOOL

Michael J. Quillinan, Bronx, N. Y.

Application October 23, 1950, Serial No. 191,640

9 Claims. (Cl. 226—86)

The present invention relates to sealing tools and has particular reference to a tool useful for sealing frangible capseals in place upon closure openings.

Sealing tools in use in the container industry today require such uniformity of operation as will insure the proper sealing of a capseal in place with respect to a container closure opening. With the increasing ranges exhibited in the chemical activity of products stored and shipped in containers has come the need for capseals offering further assurances that leaking will not occur. Leakproof closures are the watchword and stemming from this in the collateral demand for high sealing tool efficiency, not only in proper sealing of the closure, but also in tool life and tool maintainability.

While tool performance may be initially high in executing the sealing function upon capseals and caps, in the main, instances of "leakers" in container closures occur most frequently when continued usage has resulted in excessive wear and tear in the sealing tool's operating parts and correspondingly poor sealing integrity for the closure. Since sealing operations take place in far-removed as well as proximate areas of the world, a systematic check upon the tool's performance seems unlikely to meet with success, and so, the tool in addition to having durability and a long period of usefulness, must possess some means within itself for automatically compensating for tool maladjustments resulting from the loss of precision between friction surfaces.

Since permanence of such capseals themselves is an additive feature to high sealing integrity, and, since ease of application of the capseal wards off slovenly practices by the labor used to insert them in place, a capseal structure hidden within the protective confines of the closure opening and made of light gauge frangible material is desired. It remains to provide a tool which will execute the sealing operation upon such capseal structures and yet will keep in adjustment throughout its period of use.

Accordingly, the instant tool contemplates such needs and is capable of ready manipulation using a minimum of parts and requiring little or no adjustment, the sealing elements of the tool being resiliently axially mounted and having a distinct rocking action for automatically compensating tool maladjustments.

Briefly, the invention comprises a plurality of sealing teeth arranged about a tool axis. The teeth are designed to move primarily in a lateral direction along a linear path so that the teeth do not tilt. Means are provided which support the teeth each at two points and displace the same laterally without rocking as the teeth are displaced over these points. Means are provided whereby these two points are resiliently spaced by spring means. Should wear occur on either of these two points in an amount greater than on the other point, and the teeth become suspended on but one point as a result, said spring means yield to again establish what may be termed "two point suspension." This assures uniform lateral displacement without a pre-tilt. Also, should wear occur on the working faces of the teeth as they engage a capseal wall, means are provided whereby said spring means will again yield and said teeth will rotate or rock with respect to the tool axis after the teeth have been displaced to their lateral extremity without rocking. This provides an added tucking action for the capseal. Other means are provided for maintaining the teeth evenly and uniformly operable with respect to the balance of the tool either during linear displacement or during rocking.

One of the objects of the invention, therefore, is to provide a sealing tool of simple construction which provides automatic compensating means within the tool assembly and reduces and eliminates the need for servicing the assembly of parts of said tool.

Another object of the invention is to provide a sealing tool which provides superior radial displacement of the operable parts of a sealing tool assembly.

Another object of the invention is to provide a sealing tool which, in addition to providing sufficient radial displacement of the tool's operable parts, maintains said parts in uniform relationship, both axially and radially during tool operation.

Another object of the invention is to provide a sealing tool which has automatic rotating means provided on the operable portion of said tool to maintain the engaging parts of said tool in close relationship with the annular contours, resulting in a cap and capseal of the character to be described.

Still another object of the invention is to provide a sealing tool, the radially operable parts of which execute the sealing operation on a capseal with the high degree of compression.

A further object of the invention is to provide a sealing tool having superior qualities of durability, ruggedness and long economical life.

Figure 3:
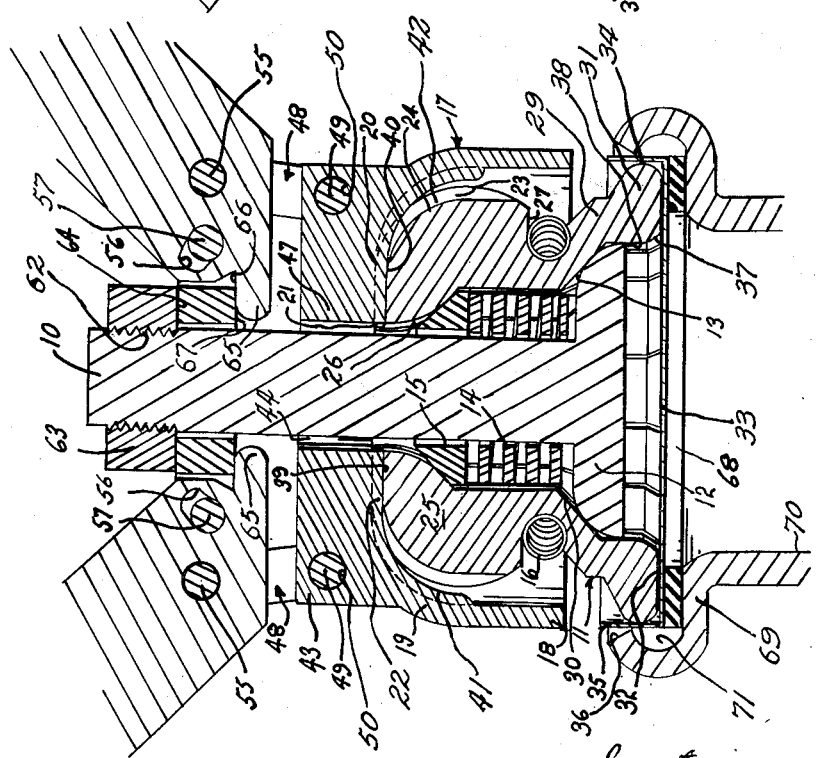

Figure 1 is a top plan view of the sealing tool with a fragment of the tool housing broken away to show the tool teeth in relation to the remainder of the tool, Figure 2 is a side elevation of the same tool, Figure 3 is a sectional side elevation view of the tool poised in place upon a typical closure opening ready for the execution of the sealing operation.

While Figure 4 is a similar sectional side elevation view of the tool in Figure 3 substantially at the end of the sealing operation.

Referring to the drawings the tool has a longitudinal spindle 10 about which are arranged a plurality of engaging teeth 11.

These teeth are also arranged at their lower position around a shoulder 12 integral with spindle 10 and terminating at its outer regions in a domed bearing area 13. Resting upon the shoulder 12 is a compressible spring 14 which coils upward a substantial distance around the spindle 10 and supports, at its upper extremity, a bearing collar 15 which is in slidable relation to the spindle 10.

Each of the engaging teeth 11 are supported by the domed bearing area 13 and the bearing collar 15 and are restrained in position about the spindle by the tension of a circuitous circumferential spring 16 which embraces the teeth substantially at their midpoints and thereby keeps the teeth substantially in yielding engagement with the above bearing surfaces. The set of teeth 11 are contained within and are surrounded by a housing 17 which has a skirt portion 18 at its lower extremity which depends from a bell-like dome 19. The dome flattens out toward the tool axis as at 20 and is perforate at its centerpoint 21 to allow the spindle to pass clearly upward therethrough. On the under and inner portions of the housing 17 are provided a series of radially extending tracks 22. These tracks 22 follow the contour of the inner surfaces of both the flat portion 20 and the dome 19 of the tool housing so as to be uniform in height and width, commencing at the perforate area 21, and continuing outwardly and thence downwardly to the point where the dome 19 joins the skirt portion 18, whereat the tracks diminish. These tracks 22 follow corresponding grooves 23 on each of the respective teeth 11 so as to substantially mate therewith and control their radial displacement. These grooves 23 follow along the upper and outer periphery of teeth 11 so as to be substantially convex.

The teeth 11 have a convex area 24 at their top. The inner section 25 of each tooth is convex to provide a cammed surface 26 which is slidable over bearing collar 15. Provided on the outer surface at substantially the midpoint of each of the teeth is a circular notch 27 at the lower extremity of the arcuate area 24. In these notches 27 the circuitous spring 16 is seated. Each of the teeth 11 has its inner surface cylindrical below the cammed surface 26 so that when the set of teeth are considered as a unit the bearing collar 15 and the compressible spring 14 are cylindrically contained. Below the notch 27 the teeth angle outward and downward, as at 29, and their inner surface 30, when considered collectively, describe a truncated cone. The domed bearing area 13 supports each of the teeth 11 at this point and slides over the inner surfaces 30, as will be described hereinafter.

At the lower extremities of each of the teeth is located the tooth proper 31 which acts upon portions of the capseal wall. On the lower underside of the tooth proper 31 is a flat sole portion 32 which engages the flat disc-like portion 33 of the capseal. A biting edge 34, which engages the cylindrically segmented lips 35 of the capseal, is located on the periphery of the teeth and is substantially semicircular in cross-section and convex about its perimeter, these shapes being governed by the shape and contours provided on the particular closure opening. The free-edge 36 of the particular typical closure opening is curled in this instance so as to be semi-circular and concave on its inner surface when viewed in section. Other configurations may be contemplated such as to be hooked or spiralled when the mouth of the closure is viewed in cross-section. The inner surfaces of the lower extremities of the teeth, as at 37, slope gradually upward to join with cylindrical surfaces 38 which in turn meets with the conal surfaces 30 of the teeth 11.

It will be noted that the tracks 22 and their grooves 23 each have flat table portions 39 and 40, respectively. The former have a substantially greater length than the latter. Also, the groove portions 41 and 42 of the tracks 22 and the grooves 23, respectively, have similar radii for corresponding mating surfaces. These radii remain constant throughout their respective curves. The significance of such radii uniformity will be disclosed hereinafter.

On the upper extremes of the housing 17 is a pressure pad 43 which may be either integrally formed with the housing or soldered thereto. The pressure pad 43 has a bored hole 44 at its center allowing the spindle 10 to freely clear the housing area. A plurality of bifurcate arms 45 extend transversely across the tool so as to be respectively parallel and substantially spaced as at 46 to provide transverse slots on either side of the continuous ring 47 that surrounds the pressure pad's bored hole 44. Links 48 are received in these transverse slots and are loosely pinned thereto by pins 49 passing through holes 50 in the bifurcate arms 45 and through holes 51 provided in the lower extremes of links 48. To dispel the possibility of the pins 49 sliding out of their pinning position, snap rings 52 are provided which overlap the openings of holes 50 in the bifurcate arm 45 and are received on ring seats provided in the extremities of the respective pins 49.

The links 48 are similarly loosely pinned by snap rings 53 to the lower portion of one of the tool's operating handles 54 having a pin 55 passing therethrough. Also provided on each of the operating handles 54 are arcuate slots 56 which allow limited rotation of the operating handles 54 about the pins 55. Passing through these slots 56 is another group of pins 57. This latter group of pins pass through holes provided in the winged extensions 59 of a bridge 60 which surrounds the spindle 10 as at 61 and is sufficiently loose on said spindle 10 to permit its free axial movement relative to the spindle. Snap rings 61 similar to the previously disclosed rings securely fasten the pins 57 within the holed winged extensions 59 of bridge 60.

Spindle 10 is threaded at its upper extremities as at 62 and a hex nut 63 is screwed into place about the spindle. The underface 64 of the nut engages the upper face of the bridge 60 substantially in the area which collars the spindle 10.

Completing the tool's structure, lugs 65, rounded at their ends, extend inwardly from the lower extremities of operating handles 54, thus providing ledges 66 which engage the underface 67 of the spindle collaring area of the bridge 60 and maintain the latter against the underface 64 of hex nut 63.

The tool in the instant modification is designed to operate upon a capseal, consisting, as previously indicated, of a flat disc-like portion 33 and integral upstanding segmented lips 35 about the perimeter of portion 33. Residing below the capseal is a compressible gasket 68 which in turn seats upon an annular, substantially flat surface 69, of the closure opening. The latter, a typified structure, has a cylindrical throat 70 extending axially downward from the flat surface 69. The free edge 36 of the closure opening is curled about its perimeter to provide a curled concave annular recess 71 substantially semi-circular in section and extending upwardly from the annular surface 69 at its outer perimeter. Annular recess 71 is of a comparable size with biting edge 34 of each of the teeth, recess 71 being larger in circumference than the biting edge 34.

The capseal is seated in place in the closure opening and the sealing tool is placed upon the capseal so that it rests upon the flat, disc-like portion 33 of the capseal.

In operation, external pressure is exerted upon the housing 17 by the application of downward force upon operating handles 54. Ledges 66 on each lug 65 bear against the underface 67 of the spindle collaring area of the bridge 68, keeping the latter fixed against the hex nut 63. Thus, lugs 65 become fulcruming points from which leverage is gained by the operating handles and about which pins 55 are permitted to rotate, limited in their displacement by the arcuate length of the slots 56.

It will be seen that the pressure of compressible spring 14 transmits an axial restoration force upward upon the housing 17 through bearing collar 15 and the teeth 11, thereby tending to displace links 48 upwardly and operating handles 54 arcuately about the aforementioned fulcruming point. Consequently, pins 57 bear against the lower parts of the slots 56 when the tool is in use.

With continued downward pressure, tool handles 54 rotate about their fulcruming points and pins 55 displace links 48 downward, which displacement in turn transmits axial operating force through pins 49 to the bifurcate arms 45 of pressure pads 43. The latter, together with housing 17 are displaced uniformly axially downward around the spindle 10.

As this operating force acts through the table portions 39 upon table portions 40 of the teeth 11, compressible spring 14 possesses enough energy to keep the bearing collar 15 rigidly in place. The result is that as the housing 17 is displaced axially relative to bearing collar 15 and domed bearing area 13, the cammed surfaces 26 and conal surfaces 30 force the teeth 11 to be displaced radially outward within the housing 17 against the circuitous, circumferential spring 16, and the grooves 23 ride in tracks 24 along the table portions 39 and 40 of the flat portion 20 of the housing 17 and the tops of the teeth 11, respectively.

With such resultant displacement, the biting edges 34 of the tooth proper 31 of each of the teeth 11 engage the lips 35, bending them against the free edge 36 of the closure opening. As the teeth 11 are further displaced, the biting edges 34 cause the lips 35 to bear against the upper extremes of annular recess 71 and to follow the contour of the latter downward in cam-like fashion, thereby compressing gasket 68 upon annular surface 69 and causing a sealing of the closure opening. With final outward displacement of the teeth 11, the biting edges press the lips 35 into close engagement with the annular recess 71.

After the sealing operation has been completed, operating pressure on the tool handles 54 is released and the circuitous spring 16, surrounding the teeth 11, restores the latter to their original position around spindle 10.

Since the above-described structures of both the capseal and the container closure are typical, it will be understood that any number of variations of both closure and capseal elements may be interposed within the confines of the outer perimeters of the described closure's elements. Thus, for instance, the flat annular surface 69 may in any particular closure opening consist of partially a flat plug portion and partially an orifice opening. Similarly, the capseal may have raised portions within their above-described lips to house a cap, plug or other such similar device.

It will be seen that the combination of bearing collar 15 and the rigid spring 14, as well as domed bearing area 13 combine to provide cammed surfaces over which the teeth 11 may ride as they are displaced axially by a housing 17. Such friction as exists between bearing collar 15 and domed bearing area 13, and cammed surface 26 and collar surface 31 respectively, on each of the teeth, will cause a wearing such as is present in any cammed surface. Since it is necessarily important that the teeth 11 and especially the teeth proper 31 remain respectively aligned about spindle 10 so as to remain parallel thereto and thus insure proper sealing of the capseal, it can be appreciated that were such wearing uncompensated for the teeth 11 would be angularly rocked from their original position even before any operating force was applied to the tool. The direction of this rocking or tilting would be dependent upon which of the two camming surfaces wears first but, in any event, proper execution of the tool's sealing function would not occur.

Consequently, the above combination is designed to provide compensating means that are automatic in nature. Spring 14, acting through bearing collar 15, restores the latter to a position either upward or downward on the tool's spindle 10. If the cammed relation between bearing collar 15 and cammed surface 26 showed greater increments of wearing, the upper portions of teeth 11 would ordinarily rotate in degree with respect to domed bearing area 13 as a result of the tension of circuitous spring 16 but is arrested from doing so by compressed spring 14 lengthening the relationship between shoulder 12 and the underface of bearing collar 15. On the other hand, should the cammed relation between domed bearing area and surface 30 of each of the teeth 11 show the greater increments of wear, the tendency would be for these teeth to rotate in degree in their lower extremes with respect to bearing collar 15. To maintain the erect position of teeth 11, therefore, spring 14 will yield to a sufficient degree by reason of the operating force axially applied on the housing 17 being transmitted through teeth 11 downward upon bearing collar 15, thereby decreasing the normal distance between the underface of the latter and shoulder 12.

It is to be appreciated that the strength of spring 14 is quite critical. Naturally, the spring must have sufficient strength to maintain a rigid foundation for the bearing collar 15 so that the latter, in combination with domed bearing area 14 unites to displace teeth 11 uniformly radially outward and downward relative to spindle 10. At the same time, there are maximum limits required for such spring strength which, should these limits be exceeded, would not allow the automatic features of these compensating means to operate efficiently. Should, for example, the lower of the two camming points show a greater increment of wear, there is a tendency for bearing collar 15 to support each of the teeth 11 along surface 26 solely, thereby leaving the teeth unsupported at their lower extremes. In such an instance, the upper camming point bears the brunt of the downward axial pressure upon teeth 11. Should this condition prevail, in addition to additional wearing at the upper camming point, there is a decreased leverage upon the teeth 11. Therefore, the spring 14 must be weak enough so that when the total of the operating force is borne upon one area, namely, bearing collar 15, instead of the two areas, namely, bearing collar 15 in combination with domed bearing area 13 as when the tool is in adjustment, that it will yield sufficiently so that the bearing collar's underface will move closer to shoulder 12 thereby moving each of the teeth 11 axially downward. Such displacement of each of the teeth results in a restoration of the original condition wherein these teeth are radially displaced by two camming points instead of one. Since, in this latter case, the bearing collar 15 again shares the effect of the operating force with domed bearing area 13, the spring 14 will again be strong enough to maintain a fixed displacement between shoulder 12 and bearing collar 15.

Moreover, it will be seen that in the event of such wearing increments, such automatic compensating means keep the teeth 11 in substantially the same radial position relative to spindle 10 that they occupied when the tool was new. Consequently, the radial displacement of the tool teeth is continued to be effected with continued uniformity. Although the axial relation of teeth 11 relative to spindle 10 changes as wearing progresses, this in no way alters the sealing operation, since the surfaces described by the biting edges 34 are substantially the same in circumference and the teeth 11 substantially are in the same erect position.

The importance of this feature of tool construction will be appreciated when the various conditions otherwise inherent in similar tool structures as well as in the sealing operation are considered. By maintaining the teeth 11 arranged about the spindle 10 so that when considered collectively their axes are co-axial with that of the spindle, the flat portions 20 of the housing 17 as well as the flat top portions of the arcuate area 24 of each of the teeth 11 are uniformly, during tool use, in a plane substantially perpendicular to the tool's axis. Thus, a tilting of the teeth 11 out of their normal position is avoided. This results in a superior method of compressing gasket 63, since when the teeth 11 are in a balanced position, sole portion 32 of the teeth proper 31 compresses the gasket throughout its width uniformly so as to maintain a planal relation throughout the under portion of the tool that is perpendicular to the tool's axis.

The tracks 22 and the grooves 23 serve a two-fold purpose. By being matingly receivable within each other they provide for uniform radial displacement of the teeth 11 within the housing 17. These guiding means insure that the biting edges 34 of the teeth proper 31 will present a uniform engaging surface when the capseal is gathered within the confines of the curled annuli 71 of the container closure. These guiding means insure uniform radial displacement throughout the sealing function and accordingly have curve portions 41 and 42 as well as flat table portions 39 and 40 on the tracks 22 and the grooves 23, respectively.

These curve portions 41 and 42, in addition to augmenting the function of the guiding means, serve as rotating means which allow each of the teeth 11 to rotate within the dome 19 of the housing 17, thereby causing biting edge 34 to tuck the cylindrical lips 35 firmly against the curled annuli 71. It is to be expected that the biting edges 34 will wear during tool life. As a result, were no means provided to overcome such wearing, the teeth proper 31 would not occupy a sufficient area of the annuli 71 and would therefore not deform the lips 35 into close engagement with annuli 71. To lessen the effect of such wearing on the biting edges 34, the above rotating means are therefore provided on the tool.

The curve portions 41 and 42 of the tracks 22 and the grooves 23, respectively, as has been stated heretofore, have uniform radii in corresponding portions of the mating surfaces of the housing 17 and the teeth 11. Similarly, the arcuate area 24 of each of the teeth 11 has a similar conformation to its corresponding portions of the inner surface of dome 19. By providing similar complementary arcs on teeth 11 and housing 17, the teeth are adapted to rock co-axially and uniformly in the following manner. When the teeth 11 are displaced radially they will reach a lateral limit defined by the surface of dome 19. If the teeth have worn on biting edges 34 after a period of time lateral movement will not tuck completely all of the lips 35 of the capseal in place. A further impetus is required to finish the task.

This impetus is supplied by further axial depression by the operator. The operator, of course, merely continues his force and the tool provides the necessary tucking. Displacing teeth 11 axially as before causes the lower end of each tooth 11 to move laterally outward as before off domed bearing area 13. However, since arcuate top portion 24 of each tooth is restrained by dome 19 of housing 17 from further lateral movement, the teeth 11 will rock within the housing 17 along grooves 23 and tracks 22 causing the inner reaches 25 of the teeth to depress collar 15 upon spring 14. This results in an upward sweeping movement by edges 34 of the teeth to engage the inner portions of lips 35. A securely tucked capseal wall is the result.

Thus, I have described a sealing tool which first moves linearly in a lateral direction and erect condition despite wear on camming points, uneven wearing being automatically compensated for by the tool. Thereafter, if wear happens to occur on the tool's biting edges by successive contacts with capseals, the teeth of the tool will rock automatically to finally tuck in any part of the capseal not completely inserted in the closure opening. This is accomplished while maintaining the same radial and axial relationship of the bodies of the teeth with respect to constant capseal dimensions.

Since the invention can be practiced in a number of designs and closure openings in an equivalent manner, a broad as distinguished from a strict reading of the following claims is desired:

I claim:

1. In a tool of the character described, a longitudinal spindle, a plurality of teeth circumjacent said spindle, work engaging feet on respective lower extremities of said teeth, a pair of longitudinally offset cam surfaces on said teeth, a pair of cammed bearing members arranged about said spindle in respectively co-operable relation with said cam surfaces, one of said bearing members being longitudinally stationary on said spindle, the other of said bearing members reciprocable along and circumjacent with respect to said spindle, longitudinal resilient means separating each of said bearing members, resilient means circumjacent to said teeth and maintaining respective cam surfaces of said teeth in co-operable relation with said bearing members, said teeth adapted to receive operating force for displacing said teeth longitudinally with respect to said spindle, said longitudinal resilient means being of sufficient strength to suport said reciprocable bearing member in co-operable relation with adjacent cam surfaces in each of the pairs thereof only when each of said teeth are engaged on both of their cam surfaces by each of said bearing members, said longitudinal resilient means providing resilient support for said reciprocable bearing member when each of said teeth are engaged solely by said reciprocable bearing member, said longitudinal resilient means being operable to yield and thereby shorten the longitudinal separation of said bearing members to bring said bearing members into engagement with the cam surfaces of said teeth when longitudinal pressure is applied thereto.

2. In a tool of the character described in claim 1, said reciprocable bearing member having a bore bored complementary to said spindle and coaxially slidable thereon.

3. In a tool of the character described in claim 1, means for housing said teeth in grouped relation about said spindle including a lateral portion complementary to said teeth, means for displacing said housing means with respect to said spindle.

4. In a tool of the character described in claim 1, means for housing said teeth in grouped relation about said spindle, said housing means including a lateral top portion, and a bell-like portion circumjacent said top portion, each of said teeth comprising a top portion complementary to, communicable with, and slidable along respective segments of said top portion of said housing means, segments of said bell-like portion adapted to receive portions of said teeth, an arcuate portion on each tooth complementary to, communicable with, and rockable within a respective segment of said bell-like portion at the lateral terminal of said top portion of said housing means.

5. In a tool of the character described in claim 4, said bell-like portion being concave with respect to said teeth, and the segments of said bell-like portion each having a radius of curvature equivalent to that of respective arcuate portions of said teeth.

6. In a tool of the character described in claim 1, means for housing said teeth in grouped relation about said spindle, said housing means communicating with said teeth, means for guiding lateral displacement of said teeth with respect to said housing means including tracks on one of the communicating surfaces of said teeth and said housing means, and grooves for receiving said tracks on the other of said communicating surfaces.

7. In a tool of the character described, a longitudinal spindle, a plurality of teeth circumjacent said spindle, work engaging feet on respective lower extremities of said teeth, a pair of cam surfaces on each of said teeth, said cam surfaces being longitudinally offset with respect to each other, a pair of cammed bearing members arranged about said spindle in respectively co-operable relation with said cam surfaces, one of said bearing members being longitudinally stationary on said spindle, the other of said bearing members reciprocable along and circumjacent with respect to said spindle, longitudinal resilient means separating each of said bearing members, resilient means connecting said teeth and maintaining respective cam surfaces of said teeth in co-operable relation with said bearing members, said teeth adapted to receive operating force for displacing said teeth longitudinally with respect to said spindle, means for housing said teeth in grouped relation about said spindle, said housing means including a lateral top portion, and a bell-like portion circumjacent said top portion, each of said teeth comprising a top portion complementary to, communicable with, and slidable along said top portion of said housing means, segments of said bell-like portion adapted to receive portions of said teeth, an arcuate portion on each tooth complementary to, communicable with, and rockable within a respective segment of said bell-like portion at the lateral terminal of said top portion of said housing means.

8. In a tool of the character described in claim 7, said bell-like portion concave with respect to said teeth, and the segments of said bell-like portion each having a radius of curvature equivalent to that of respective arcuate portions of said teeth.

9. In a tool of the character described in claim 7, means for guiding lateral displacement of said teeth with respect to said housing means including tracks on one of the communicating surfaces of said teeth and said housing means, and grooves for receiving said tracks on the other of said communicating surfaces.

References Cited in the file of this patent

UNITED STATES PATENTS

| Number | Name | Date |
|---|---|---|
| 1,585,820 | Baum | May 25, 1926 |
| 1,954,737 | Kowal | Apr. 10, 1934 |
| 2,085,879 | Trump | July 6, 1937 |
| 2,104,671 | Pierce | Jan. 4, 1938 |
| 2,204,594 | Hogg | June 18, 1940 |